United States Patent

Ono

[19]

[11] Patent Number: 5,955,963
[45] Date of Patent: Sep. 21, 1999

[54] RADIO SELECTIVE CALLING RECEIVER

[75] Inventor: Hiroshi Ono, Tokyo, Japan

[73] Assignee: NEC Corporation, Tokyo, Japan

[21] Appl. No.: 08/962,566

[22] Filed: Nov. 3, 1997

Related U.S. Application Data

[63] Continuation of application No. 08/494,563, Jun. 22, 1997, abandoned.

[30] Foreign Application Priority Data

Jun. 23, 1994 [JP] Japan .................................. 6-141467

[51] Int. Cl.$^6$ ........................................................ H04Q 7/00
[52] U.S. Cl. ............................... 340/825.44; 340/825.27; 340/825.47; 455/38.2; 455/38.3; 455/38.4; 455/343
[58] Field of Search ...................... 340/825.44, 825.47, 340/825.27; 455/38.2, 38.4, 38.3, 343

[56] References Cited

U.S. PATENT DOCUMENTS

| | | | |
|---|---|---|---|
| 3,488,596 | 1/1970 | Webster et al. | 325/492 |
| 4,804,954 | 2/1989 | Macnak et al. | 340/825.44 |
| 4,964,121 | 10/1990 | Moore | 370/100.1 |
| 5,089,813 | 2/1992 | DeLuca et al. | 340/825.44 |
| 5,434,563 | 7/1995 | Kudoh | 340/825.44 |
| 5,448,228 | 9/1995 | Wagai et al. | 340/825.44 |
| 5,535,427 | 7/1996 | Miyashita et al. | 455/38.1 |

FOREIGN PATENT DOCUMENTS 2136616 9/1984 United Kingdom .
2267167 11/1993 United Kingdom .

*Primary Examiner*—Brian Zimmerman
*Assistant Examiner*—Yonel Beaulieu
*Attorney, Agent, or Firm*—Sughrue, Mion, Zinn Macpeak & Seas, PLLC

[57] ABSTRACT

Only information selected from messages transmitted to many persons, especially an unspecified number of persons on the reception side is received by setting the frequency of reception for each call number or each type of information on the reception side and determining the frequency of reception from transmitted messages, thereby reducing the power consumption of a receiver by eliminating an unnecessary operation performed by a reception circuit, and reducing the used capacity of a message memory in the receiver by eliminating unnecessary information stored in the memory. The radio selective calling receiver includes a means for setting a reception period for each call number or type of information, wherein a reception permission mode and a reception inhibition mode are switched for each call number or type of information by determining the call number or type of information from an incoming message following a call number, a timer circuit for counting the reception period, and a CPU for changing a battery saving control method of ON/OFF-controlling power supply to a reception circuit. A reception period is set by the switching operation of the receiver or determined in accordance with a signal from an external computer. With this operation, only selected messages are received and saved, thus power supply and message memory is conserved.

14 Claims, 17 Drawing Sheets

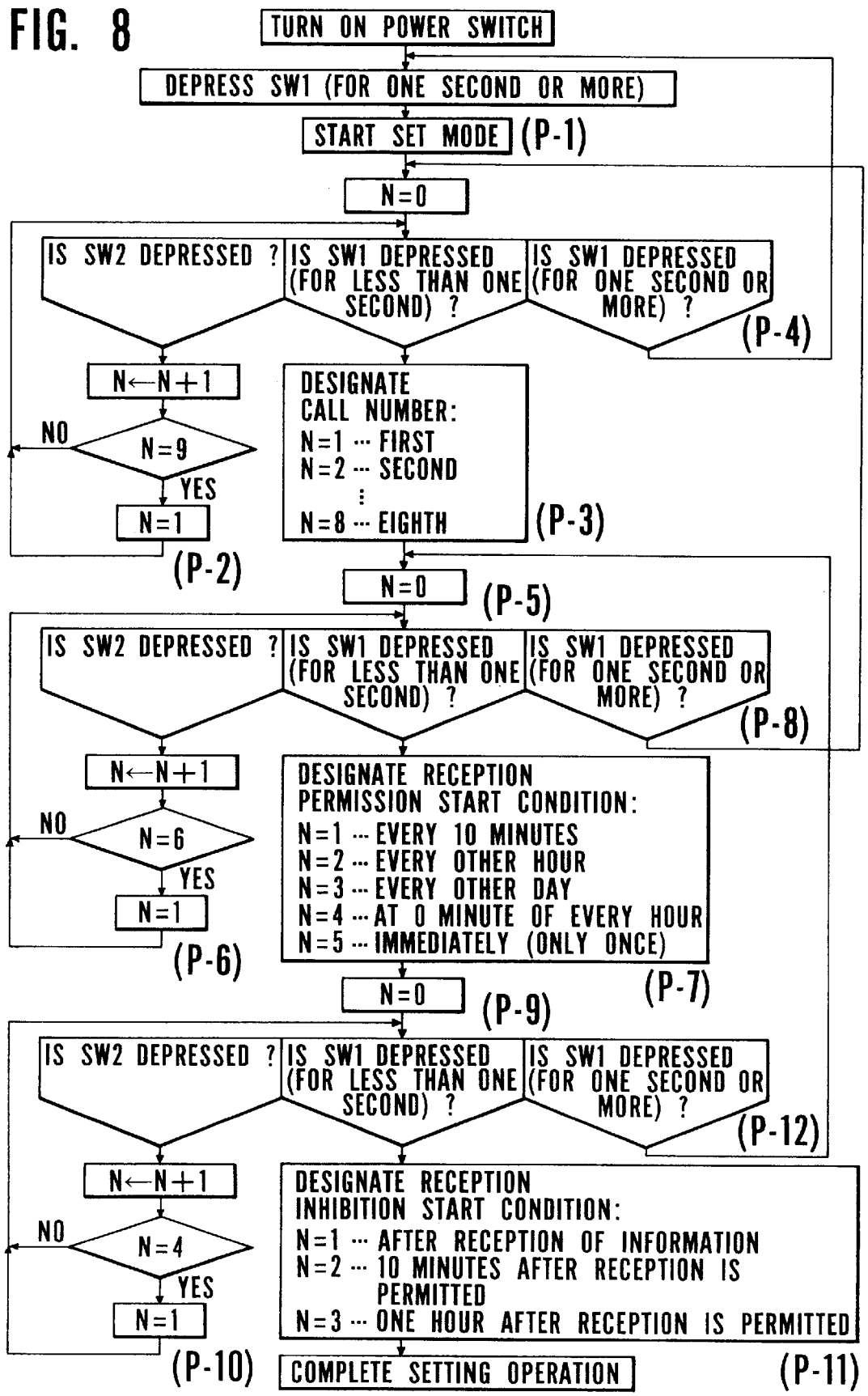

FIG. 9

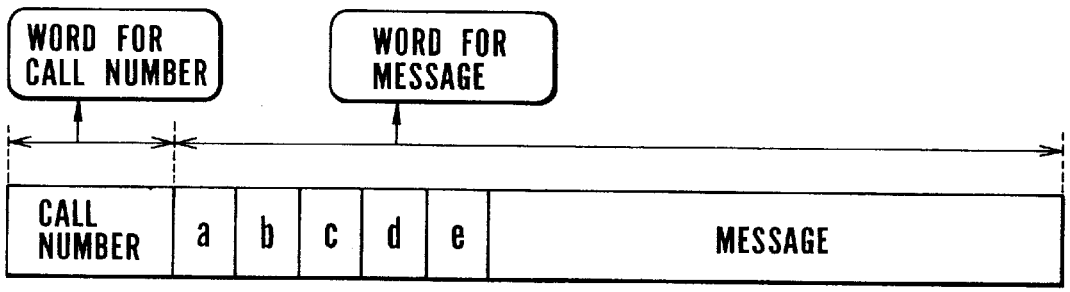

FORMAT a : (ONE BYTE)
   INFORMATION NUMBER
      DESIGNATION DATA 1~8 --- INFORMATION NUMBER 1~8 b : (ONE BYTE)
   PRESENCE/ABSENCE OF RECEPTION PERIOD
      "1" ..................... PRESENT
      "0" ..................... ABSENT (SUCCEEDING MESSAGE IS NOT
                                        TRANSMISSION PERIOD
                                        INFORMATION)

c : (ZERO OR ONE BYTE)
   RECEPTION PERMISSION MODE START CONDITION (ONLY WHEN b=1) :
      "1" ..................... EVERY 10 MINUTES
      "2" ..................... EVERY OTHER HOUR
      "3" ..................... EVERY OTHER DAY
      "4" ..................... FROM 0 MINUTE OF EVERY HOUR
      "5" ..................... IMMEDIATELY (ONLY ONCE)
      "6" ..................... DESIGNATED TIME d : (ZERO OR SIX BYTES)
   DESIGNATED TIME (ONLY WHEN c=6)
      "D D H H M M" -------- DAY , HOUR , MINUTE e : (ZERO OR ONE BYTE)
   RECEPTION INHIBITION MODE START CONDITION (ONLY WHEN b=1)
      "1" ..................... AFTER RECEPTION OF INFORMATION
      "2" ..................... 10 MINUTES AFTER RECEPTION IS
                                 PERMITTED
      "3" ..................... ONE HOUR AFTER RECEPTION IS
                                 PERMITTED

FIG. 12

| CALL NUMBER | POCSAG ADDRESS | POCSAG FUNCTION ADDRESS |
|---|---|---|
| FIRST | FIRST ADDRESS (SEVEN-DIGIT DECIMAL NUMBER) | 0 |
| SECOND | | 1 |
| THIRD | | 2 |
| FOURTH | | 3 |
| FIFTH | SECOND ADDRESS (SEVEN-DIGIT DECIMAL NUMBER) | 0 |
| SIXTH | | 1 |
| SEVENTH | | 2 |
| EIGHTH | | 3 |

FIG. 13

| INFORMATION NUMBER | FIRST CHARACTER OF MESSAGE (NUMBER AND LETTER IN "( )" ARE JIS CODE) |
|---|---|
| 1 | "1" (31h) |
| 2 | "2" (32h) |
| 3 | "3" (33h) |
| 4 | "4" (34h) |
| 5 | "5" (35h) |
| 6 | "6" (36h) |
| 7 | "7" (37h) |
| 8 | "8" (38h) |

RADIO SELECTIVE CALLING RECEIVER

This is a Continuation of application Ser. No. 08/494,563, filed Jun. 22, 1997, now abandoned.

BACKGROUND OF THE INVENTION

1. Field of the Invention

The present invention relates to a radio selective calling receiver and, more particularly, to a radio selective calling receiver having a function of limiting the frequency of reception of messages.

2. Description of the Related Art

FIG. 1 shows the arrangement of a conventional radio selective calling receiver. The radio selective calling receiver is constituted by a reception antenna 1 for receiving a carrier wave modulated by a call number and a message, a reception circuit 2 for demodulating the signal received by the reception antenna 1, a decoder 3 for determining whether the received signal is for the home receiver, and decoding the signal, an EEPROM 4 for storing the call number of the home receiver, a battery saving control circuit (to be abbreviated to BS control circuit) 5 for controlling power supply to the reception circuit 2, an incoming message memory 7 for storing incoming messages, a switch operation unit 11, a detection circuit 12 for detecting the operation of the switch operation unit 11, an LCD 17 for displaying a message, a display control unit 16 for controlling the display operation of the LCD 17, and a CPU 6.

As shown in FIGS. 2 and 3, after the power switch of the radio selective calling receiver is turned on (step F-1), the BS control circuit 5 performs control (BS operation 1) to intermittently supply power to the reception circuit 2 until a preamble signal for bit synchronization is received. The reception circuit 2 performs an intermittent reception operation (step F-2). When a preamble signal is detected by the decoder 3 (step F-3), the decoder 3 outputs a signal to the BS control circuit 5 to stop the intermittent power supply to the reception circuit 2 and keep it on (step F-4). The reception circuit 2 continues the reception operation and waits for a frame synchronization signal. When the frame synchronization signal is detected (step F-5), the BS control circuit 5 performs control (BS operation 2) again (step F-6) to intermittently supply power to the reception circuit 2 so as to allow the reception circuit 2 to operate at a timing matched with a frame number corresponding to the call number of the receiver and wait for the call number of the home receiver. When the call number of the home receiver is detected by the decoder 3 (step F-7), power is intermittently supplied to the reception circuit 2 (step F-8). A message for the home receiver, which is received after the call number, is then decoded (step F-9) and stored in the incoming message memory 7. If an incoming signal is continuously received (step F-11) after all messages are received (step F-10), a call number is waited for (step F-7). If no incoming signal is received, the flow returns to the step of waiting for a preamble signal (step F-3). The intermittent power supply operation (BS operation 1) is then performed (step F-4).

In this conventional radio selective calling receiver, when information corresponding to a designated call number is transmitted on a radio signal to the receiver, a message added to the call number is received. For this reason, all the messages transmitted from the transmission side, including information unnecessary for a user on the reception side, must be received.

Essentially, a conventional radio selective calling receiver of this type is a means for transmitting messages to each user on the reception side. Therefore, all the messages which are transmitted to the receiver under its selective call number peculiar to the receiver are to be received. Among recently developed radio selective calling receivers, there is one capable of enjoying a so-called simulcast service under which one radio selective calling receiver has a plurality of selective call numbers, one being peculiar to the receiver and the others being common to some other receivers and the one receiver is capable of receiving either a call and a message peculiar to itself under the peculiar call number or a call and a message common to the other receivers under the common call number. The simulcast service allows transmission of the same message to a plurality of radio selective calling receivers. That is, simultaneous transmission can be performed. Some of the messages received under the simulcalst service may be unnecessary for a user on the reception side, but the user on the reception side cannot select incoming messages.

As described above, the conventional radio selective calling receiver does not allow a user on the reception side to select incoming messages. Therefore, with an increase in the number of messages transmitted, the reception circuit of the receiver has to operate unnecessarily more frequently, resulting in an increase in the power consumption of the receiver.

SUMMARY OF THE INVENTION

The present invention has been made in consideration of the above problem, and has as its object to provide a radio selective calling receiver which allows a user on the reception side to select a message to be received in accordance with his/her will so as to realize low power consumption and decrease unnecessary consumption of the storage area of a message memory by receiving no unnecessary message.

A radio selective calling receiver of the present invention comprises a memory for setting a reception period for each call number, the memory being adapted to set a second reception period for each call number, a timer circuit for counting a reception period, and a battery saving control circuit for ON/OFF-controlling power supply to the reception circuit at the second period. In the receiver, means for controlling the reception circuit at a set reception period repeatedly performs battery saving control of intermittently supplying power to the reception circuit when reception is permitted, continuously performs message reception when the call number of the home receiver is received, and performs control to completely stop power supply to the reception circuit when reception is inhibited. In the receiver, when the receiver has a plurality of call numbers, means for controlling the reception circuit at a set reception period repeatedly performs battery saving control of intermittently supplying power to the reception circuit when reception of at least one call number is permitted, continuously performs message reception when reception of an incoming call number is permitted, and performs battery saving control of the reception circuit without receiving any succeeding message when reception is inhibited. As other constituent means, the receiver comprises a memory for setting a reception period for each information, the memory being adapted to set a second reception period for each type of information, a timer circuit for counting the reception period, and a battery saving control circuit for ON/OFF-controlling power supply to a reception circuit. In the receiver, means for controlling the reception circuit at the set second reception period repeatedly performs battery saving control of intermittently supplying power to the reception circuit when reception of at least one type of information is permitted, continuously performs message reception when a type of information which can be determined from part of a message following an incoming call number indicates permission of reception, and stops message reception and performs battery saving control of the reception circuit when the type of information indicates inhibition of reception. In the receiver, means for controlling the reception circuit by changing a reception period in accordance with the intention of a user comprises means for performing reception permission processing at predetermined intervals, means for performing reception permission processing at a desired time, and means for keeping a reception permission state for a predetermined period of time. The first means for setting a reception period sets a reception period by a switching operation of the receiver. The second means sets a reception period in accordance with a signal from a computer connected to the receiver. The third means has a function of decoding reception period designation data designated in an incoming message, and setting the data in the reception period setting memory.

BRIEF DESCRIPTION OF THE DRAWINGS

FIG. 8 is a flow chart showing a reception period setting operation in the first embodiment of the present invention;

FIG. 9 shows a message format for designating a transmission period for each information according to the second and fourth embodiments of the present invention;

FIG. 12 shows correspondence between call numbers, addresses in the POCSAG signal format, and function addresses in the first and third embodiments of the present invention;

FIG. 13 shows correspondence between each information number and the first character of a corresponding message in the second and fourth embodiments of the present invention;

DETAILED DESCRIPTION OF THE PREFERRED EMBODIMENT

Figure 4:
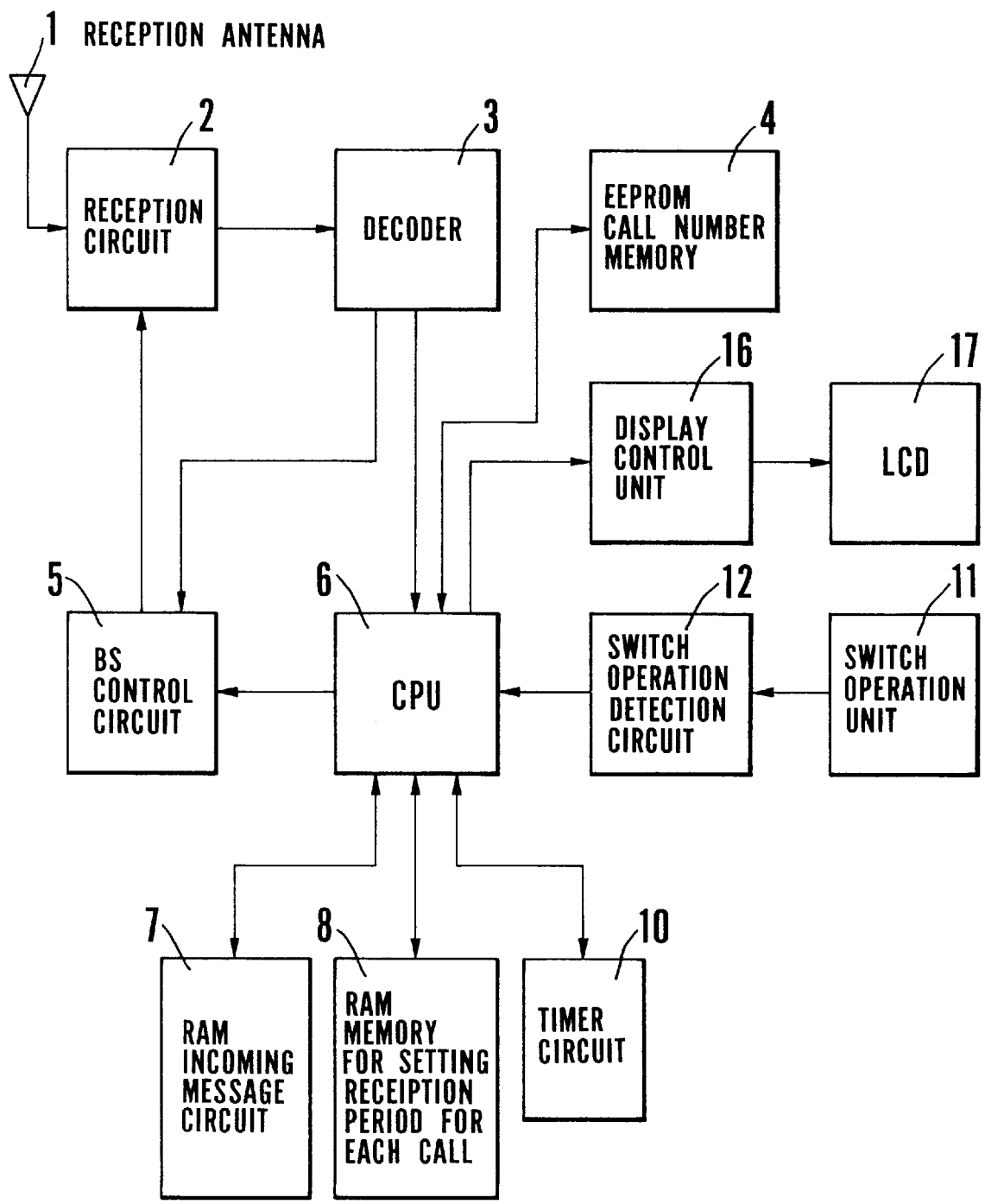
FIG. 4 is a block diagram showing the arrangement of a radio selective calling receiver according to the first embodiment of the present invention.

FIG. 4 is a block diagram showing the arrangement of a radio selective calling receiver according to the first embodiment of the present invention. Reference numeral 1 denotes a reception antenna for receiving a carrier wave modulated by a call number and a message; 2, a reception circuit for demodulating the signal received by the reception antenna 1; 3, a decoder for determining whether the received signal is for the home receiver, and decoding the signal; 4, an EEPROM for storing the call number of the home receiver; 5, a battery saving control circuit (to be abbreviated to BS control circuit) for controlling power supply to the reception circuit 2; 7, an incoming message memory for storing incoming messages; 8, a RAM capable of designating a reception period for each call number; 10, a timer circuit for performing a time counting operation to determine whether to switch between a reception permission mode and a reception inhibition mode; 11, a switch operation unit for setting a reception period; 12, a detection circuit for detecting the operation of the switch operation unit 11; 17, an LCD for displaying a message; 16, a display control unit for controlling the display operation of the LCD 17; and 6, a CPU.

Figure 5:
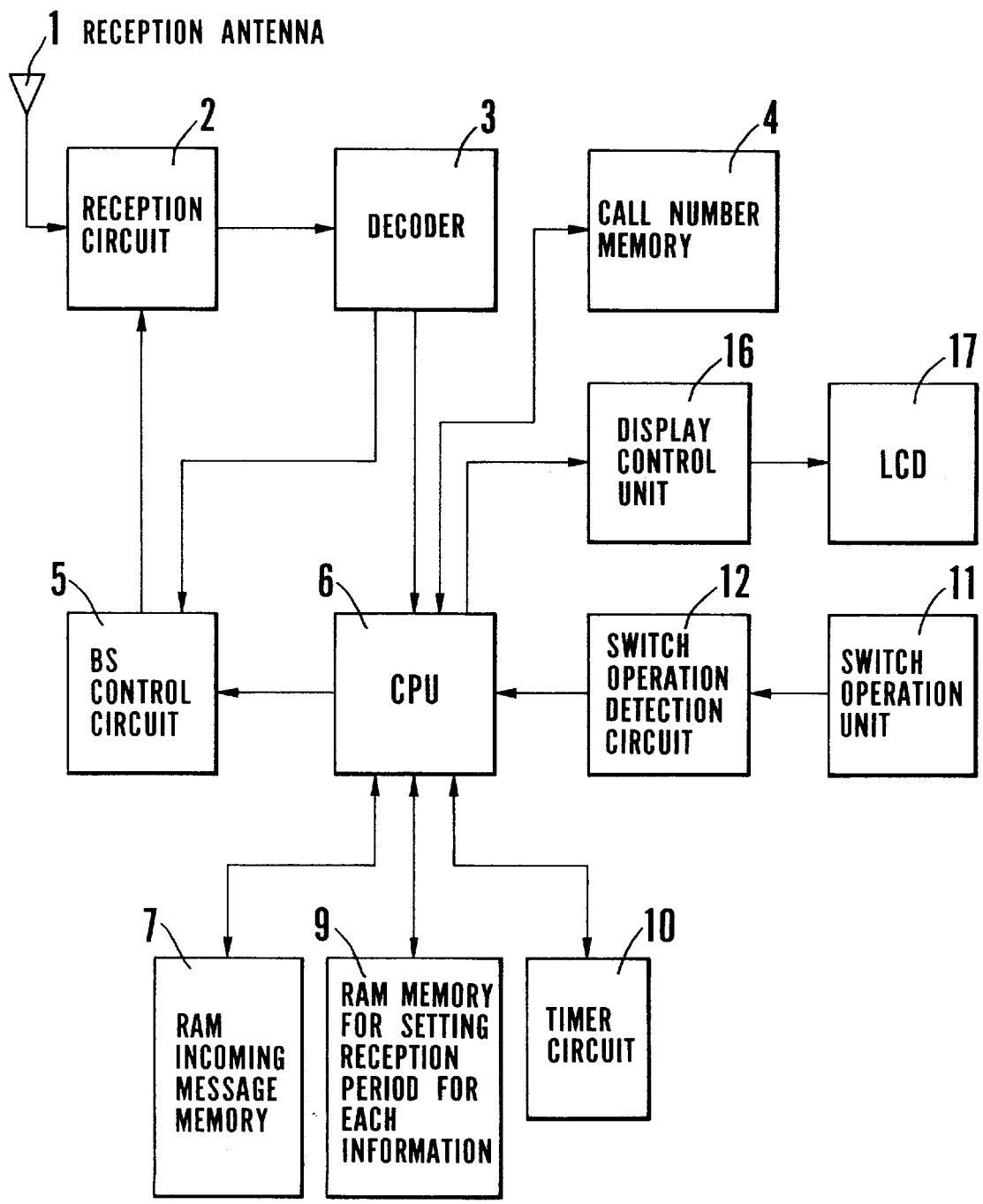
FIG. 5 is a block diagram showing the arrangement of a radio selective calling receiver according to the second embodiment of the present invention.

FIG. 5 is a block diagram showing the arrangement of a radio selective calling receiver according to the second embodiment of the present invention. Referring to FIG. 5, this radio selective calling receiver includes a RAM 9 capable of designating a reception period for each information, in place of the memory 8 for setting a reception period for each call number, to have a function of decoding transmission period designation data for each information included in incoming message and changing/setting a reception period. Since other circuit arrangements are the same as those of the embodiment shown in FIG. 4, a description thereof will be omitted.

Figure 6:
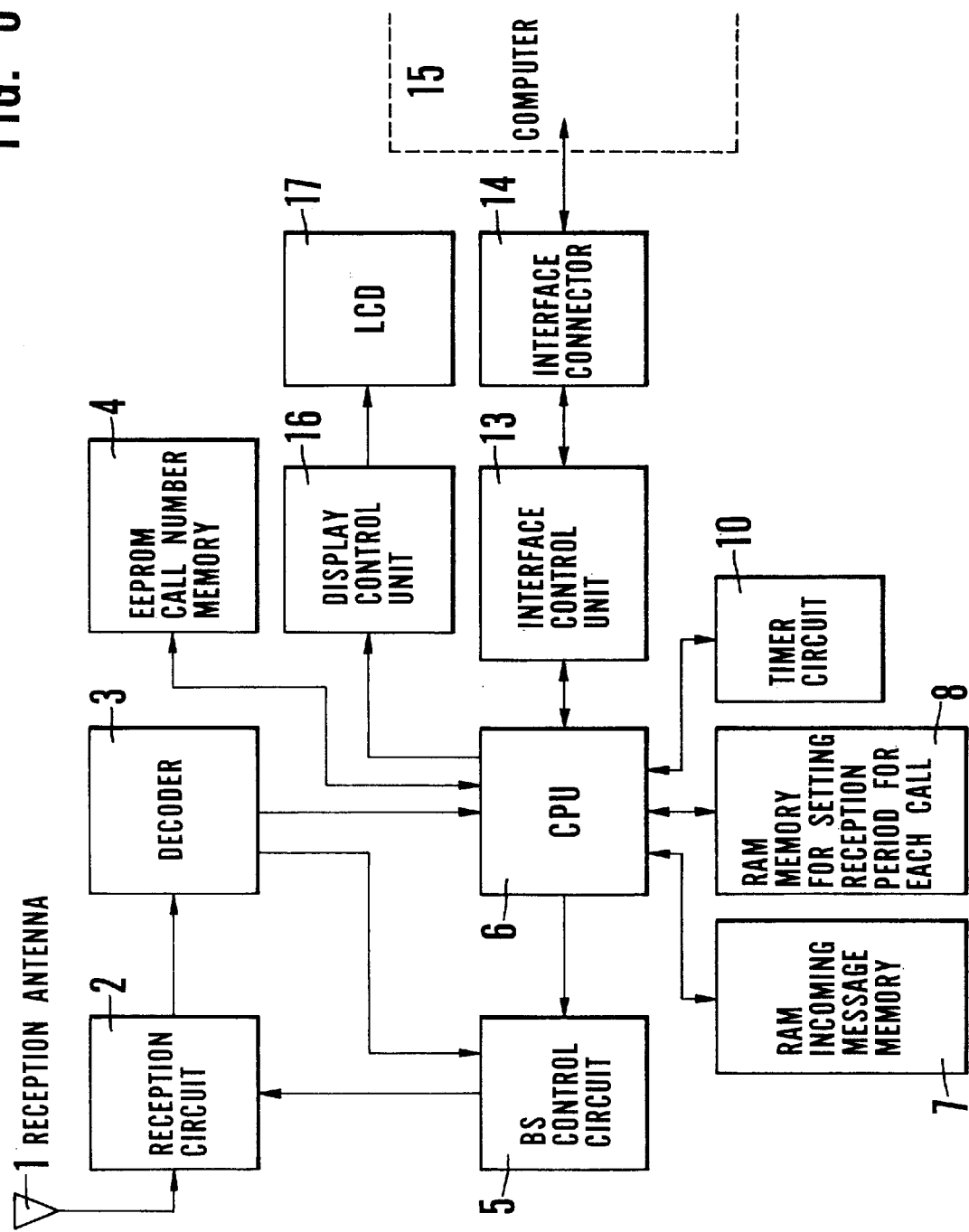
FIG. 6 is a block diagram showing the arrangement of a radio selective calling receiver according to the third embodiment of the present invention.

FIG. 6 is a block diagram showing the arrangement of a radio selective calling receiver according to the third embodiment of the present invention. Referring to FIG. 6, reference numeral 13 denotes an interface control unit for performing connection control with respect to an external computer 15; and 14, an interface connector for connection to the external computer 15. With this arrangement, this radio selective calling receiver can set a reception period in accordance with a signal from the external computer 15 instead of the switching operation of the receiver. Other circuit arrangements are the same as those shown in FIG. 4.

Figure 7:
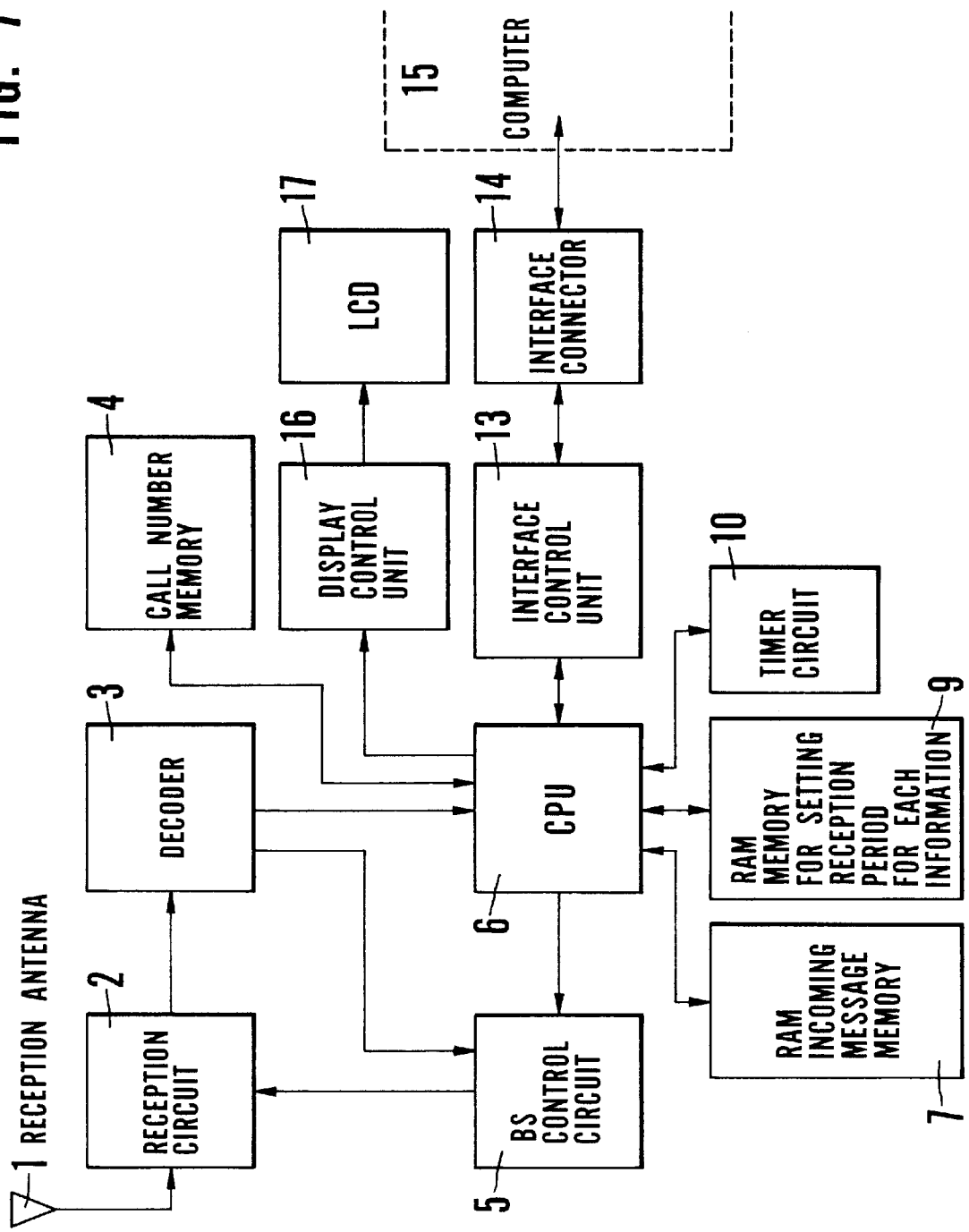
FIG. 7 is a block diagram showing the arrangement of a radio selective calling receiver according to the fourth embodiment of the present invention.

FIG. 7 is a block diagram showing the arrangement of a radio selective calling receiver according to the fourth embodiment of the present invention. This radio selective calling receiver can set a reception period for each information instead of each call number. A CPU 6 has a function of decoding transmission period designation data for each information included in an incoming message and changing/setting a reception period. Other circuit arrangements are the same as those shown in FIG. 6.

Figure 1:
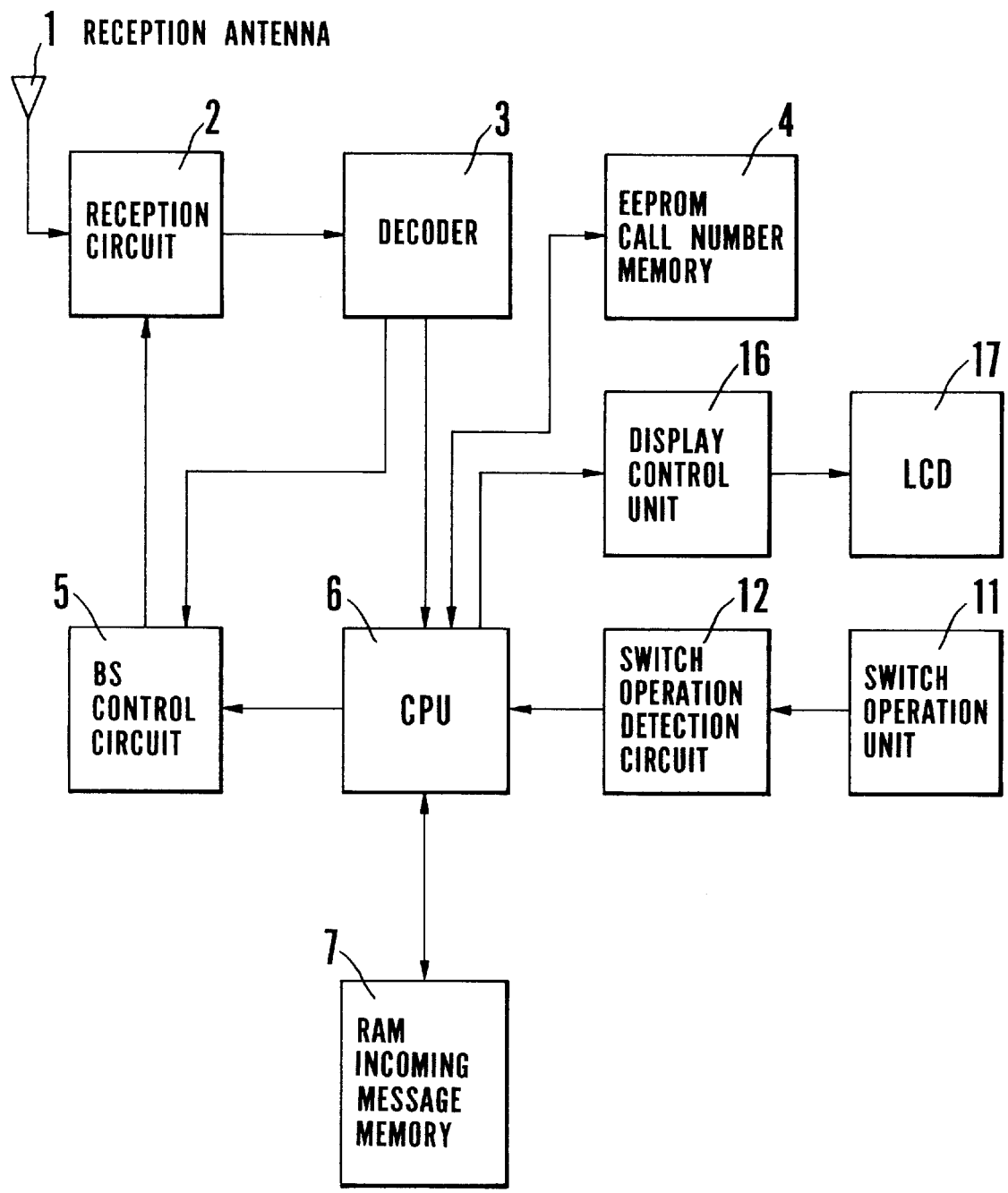
FIG. 1 is a block diagram showing the arrangement of a conventional radio selective calling receiver.
Figure 2:
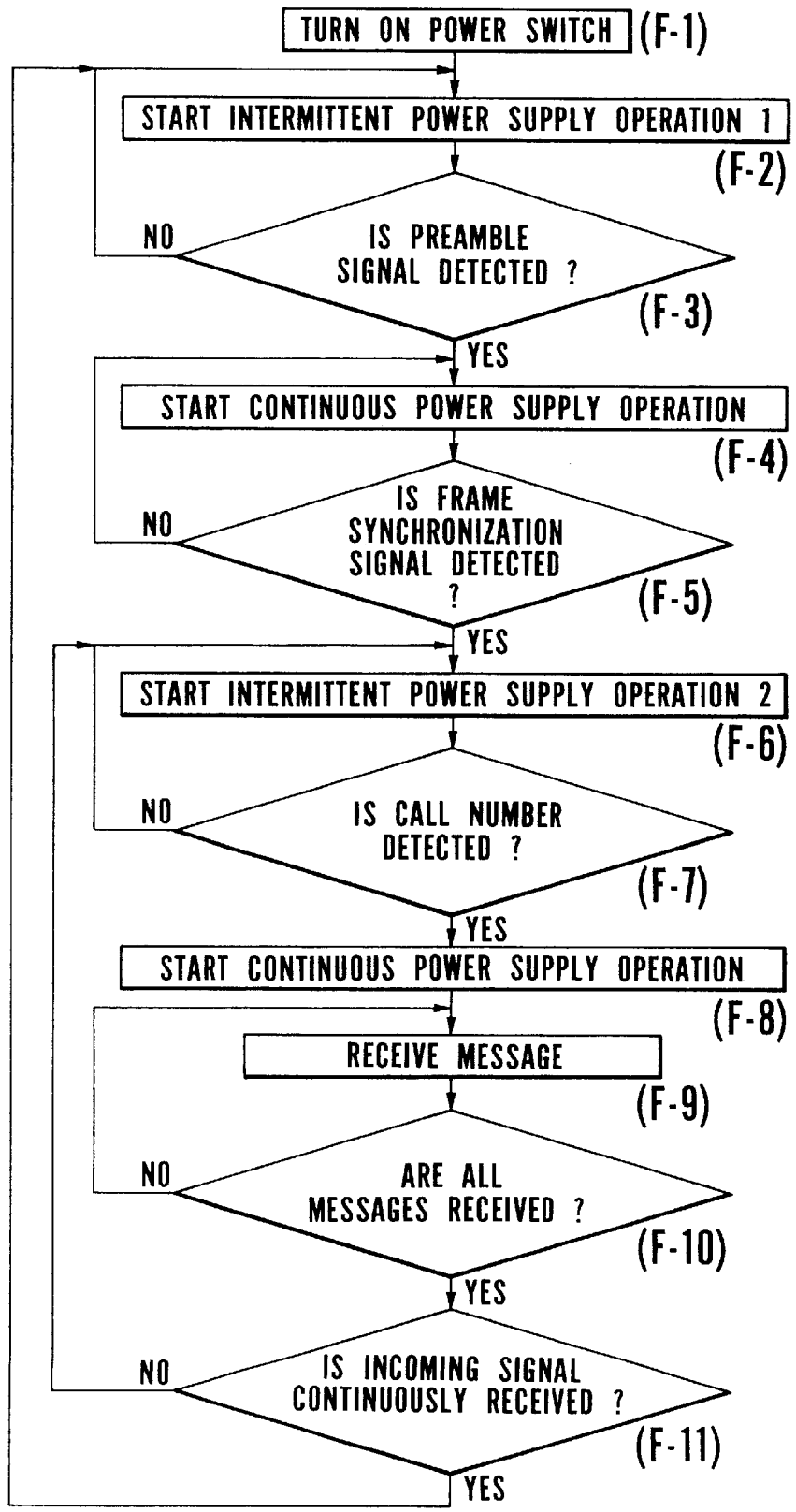
FIG. 2 is a flow chart showing the battery saving control operation of the conventional radio selective calling receiver.
Figure 3:
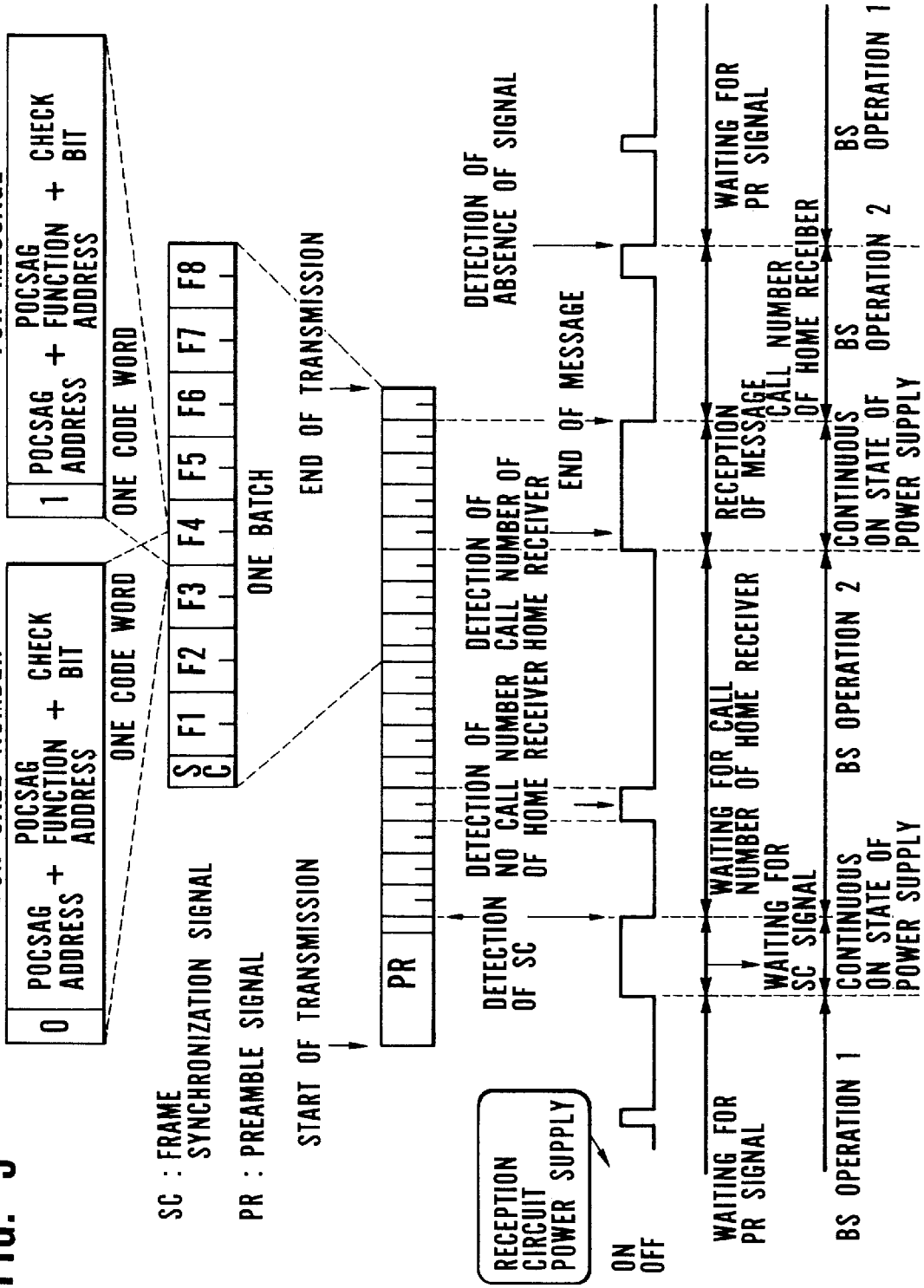
FIG. 3 is a timing chart showing the message reception operation and battery saving control operation of the conventional radio selective calling receiver.

The circuit operation of each of the above embodiments will be described below. Since the basic circuit operation is the same as that of the conventional radio selective calling receiver described with reference to FIGS. 2 and 3, a description thereof will be omitted, and only the unique operation of the present invention will be described below with reference to FIG. 8.

After the power switch of the receiver is turned on, a switch SW1 arranged on the switch operation unit 11 is depressed for one second or more to set a reception period setting mode (step P-1). Thereafter, the number (N) of times that a switch SW2 arranged on the switch operation unit 11 is depressed is counted (step P-2). If the switch SW1 is depressed for less than one second, a call number for setting a reception period is selected in accordance with the number N of times of depression (step P-3). This call number can be selected from, e.g., eight call numbers. If the switch SW1 is depressed for one second or more, the flow returns to the step before the step of setting the reception period setting mode (step P-4).

After step P-3, the number N of times of depression is cleared to zero (step P-5), and the number N of times the switch SW2 is depressed is counted (step P-6). If the switch SW1 is depressed for less than one second, a reception permission mode start condition is selected in accordance with the number N of times of depression (step P-7). This reception permission mode start condition can be selected from, e.g., five conditions, i.e., "every 10 minutes", "every other hour", "every other day", "from 0 minute of every hour", and "immediately (only once)". If the switch SW1 is depressed for one second or more, the flow returns to the step before the step of setting the reception period setting mode (step P-8).

After step P-7, the number N of times of depression is cleared to zero (step P-9), and the number N of times the switch SW2 is depressed is counted (step P-10). If the switch SW1 is depressed for less than one second, a reception inhibition mode start condition is selected in accordance with the number N of times of depression (step P-11). This reception inhibition mode start condition can be selected from three conditions, i.e., "after reception of information", "10 minutes after the permission mode is started", and "one hour after the permission mode is started". If the switch SW1 is depressed for one second or more, the flow returns to the step before the step of selecting a call number of setting a reception period (step P-12).

FIG. 9 shows a message format for designating a transmission period for each information in the second and fourth embodiments of the preset invention.

When transmission period designation data like the one shown in FIG. 9 is sent from the transmission side, the data is decoded to set the reception period of the receiver.

Referring to FIG. 9, item a is a portion for designating an information number. This portion is used to designate one of eight numbers, i.e., "1" to "8". Succeeding item b is a portion for designating the presence/absence of reception period designation data. When item b is "1", reception period designation data is present. When item b is "0", reception period designation data is not present.

Item c is set only when item b is "1". Item c is a portion for setting a reception permission mode start condition. That is, item c is used to select one of the conditions, "every 10 minutes", "every other hour", "every other day", "from 0 minute of every hour", "immediately (only once)", and "designated time", as a reception permission mode start condition.

Item d is a portion for designating a designated time when item c is "6", i.e., the reception permission mode start condition is "designated time". Item d is set only when item c is "6".

Item e is set only when item b is "1". Item e is a portion for setting a reception inhibition mode start condition. That is, item e is used to select one of the conditions, i.e., "after reception of information", "10 minutes after the permission mode is started", and "one hour after the permission mode is started", as a reception inhibition mode start condition.

Figure 10:
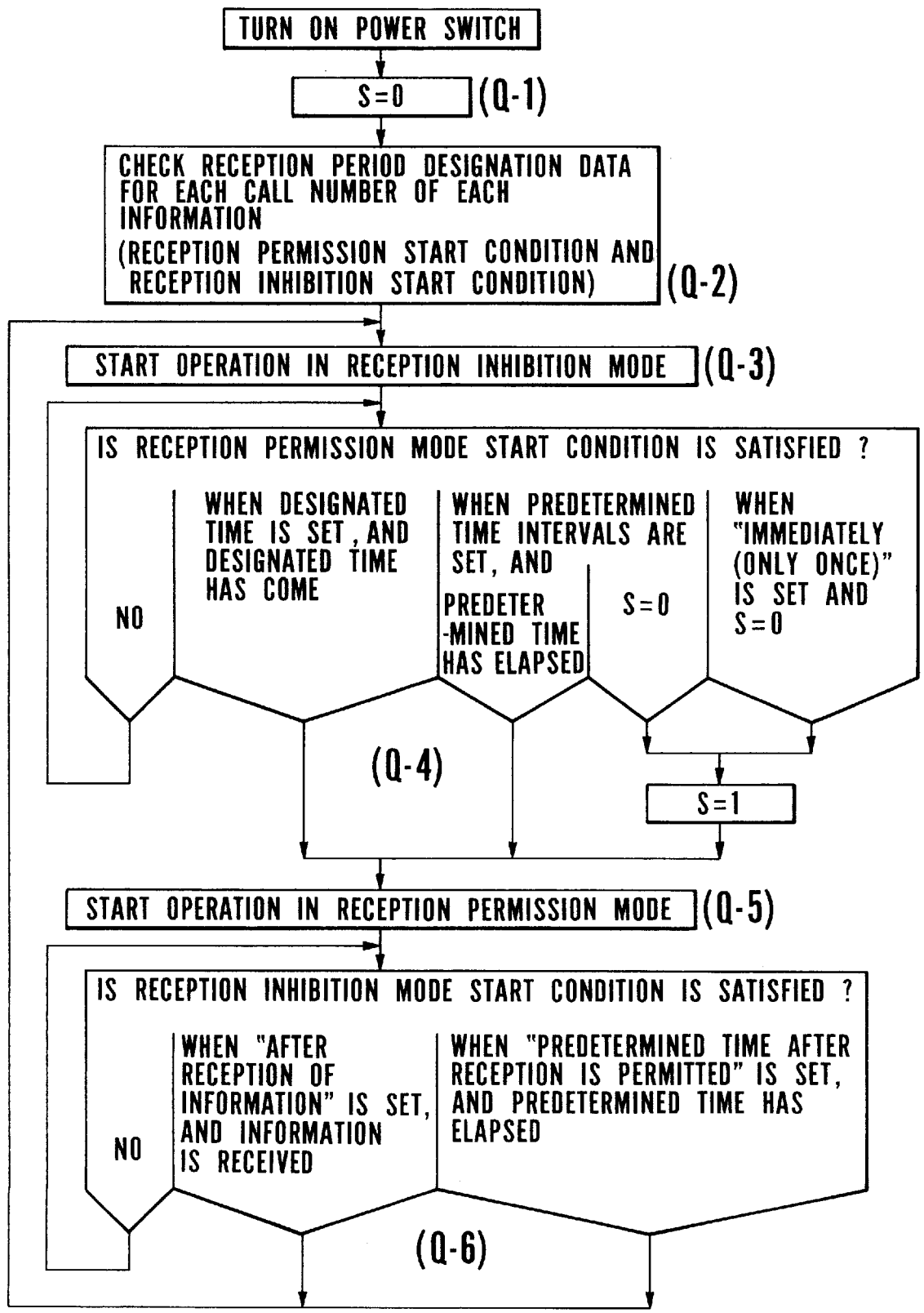
FIG. 10 is a flow chart showing an outline of reception mode switching operation in the first to fourth embodiments of the present invention.

FIG. 10 is a flow chart showing an outline of reception mode switching operation in the first to fourth embodiments of the present invention.

After the power switch of the receiver is turned on, S =0 is set (step Q-1). The CPU 6 checks the memory 8 for setting a reception period for each (according to the first and third embodiments) or the memory 9 for setting a reception period for each information (according to the second and fourth embodiments) (step Q-2), and starts the operation in the reception inhibition mode (step Q-3). If the designated reception permission mode start condition is satisfied during the operation in the reception inhibition mode (step Q-4), the reception inhibition mode is switched to the reception permission mode (step Q-5). If the designated reception inhibition mode start condition is satisfied during the operation in the reception permission mode (step Q-6), the reception permission mode is switched to the reception inhibition mode again (step Q-3). By repeatedly performing this operation, switching between the reception inhibition mode and the reception permission mode is performed. This flow chart is designed such that a mode switching operation is performed for each call number or each information independently of the receiver instead of being performed with respect to the receiver.

Figure 11:
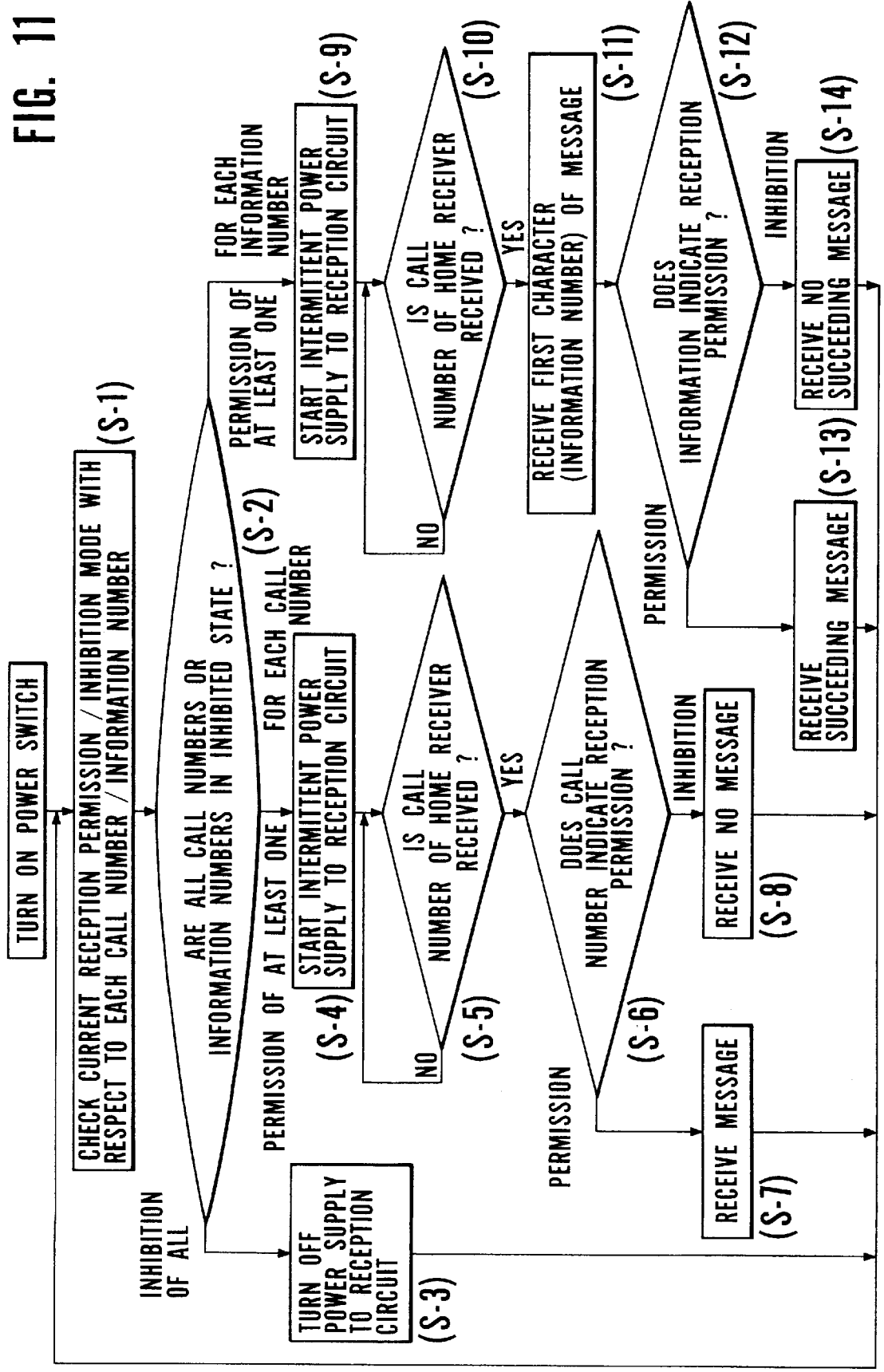
FIG. 11 is a flow chart showing an outline of operation in each reception mode in the first to fourth embodiments of the present invention.

FIG. 11 is a flow chart showing an outline of operation in each reception mode in the first to fourth embodiments of the present invention.

After the power switch of the receiver is turned on, the CPU 6 checks each reception mode switched for each call number or each information in FIG. 10 (steps S-1 and S-2). If all the call numbers or information numbers correspond to the reception inhibition mode, the power supply to the reception circuit is turned off (step S-3) to inhibit reception operation. If at least one call number of information number corresponds to the reception permission mode, power is intermittently supplied to the reception circuit 2 (battery saving (BS) operation) (steps S-4 and S-9). If the call number of the home receiver is received (steps S-5 and S-10), the CPU 6 performs determination in accordance with the call number (step S-6) in the case of designation for each call number. In the case of designation for each information number, the CPU 6 performs determination, starting from the first character of a message (step S-11). If the information corresponds to the reception permission mode, the message is received (steps S-7 and S-13). If the information corresponds to the reception inhibition mode, no message is received (steps S-8 and S-14), and battery saving operation is performed (step S-1). The CPU 6 always checks the current reception mode state for each call number or each information number and performs the above operation in accordance with the state.

FIG. 12 shows correspondence between call numbers, addresses in the POCSAG signal format, and function addresses in the first and third embodiments of the present invention. In call numbers "1" to "8", combinations of the POCSAG addresses and the function addresses are expressed.

FIG. 13 shows correspondence between each information number and the first character of a corresponding message in the second and fourth embodiment of the present invention. An information number indicating the type of information can be determined from the first character of each message.

Figure 14:
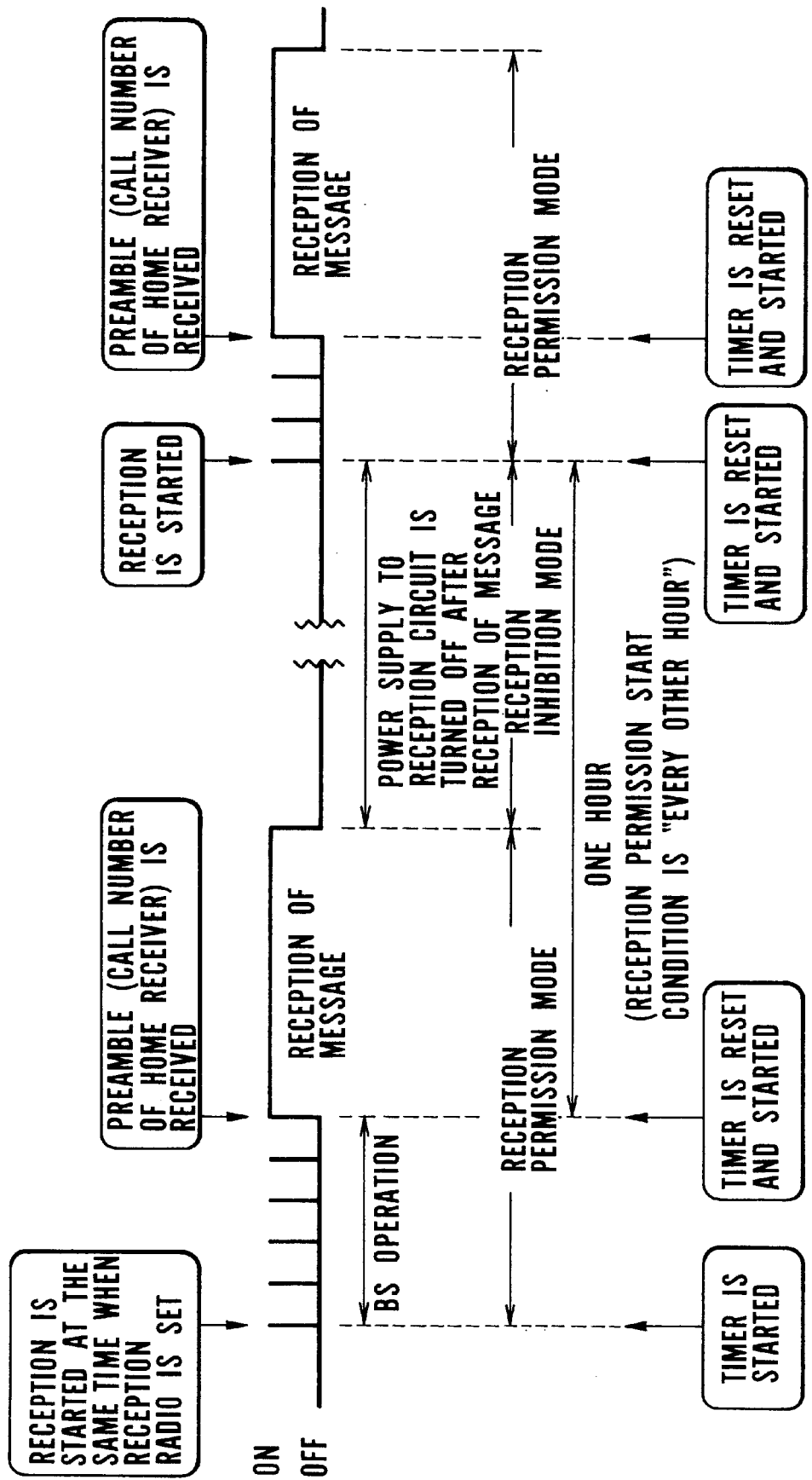
FIG. 14 is a timing chart showing a reception mode switching operation in the embodiments of the present invention.

FIG. 14 is a timing chart showing the reception mode switching operation in the embodiments of the present invention.

This timing chart shows operation to be performed when only one call number or information number is set, a reception permission mode start condition is set to be "at predetermined intervals" ("ever other hour" in this case), and a reception inhibition mode start condition is set to be "a predetermined time after the reception permission mode is started" ("10 minutes after the reception permission mode is started" in this case). When a reception period is set, BS operation is performed first in the reception permission mode. At the same time, the timer circuit 10 for performing a time counting operation for determination of a reception inhibition mode start condition is started. If information is received during the reception permission mode, the timer circuit 10 is reset and started to perform time counting operation for determination of a reception permission mode start condition, thereby continuously receiving a message. Upon completion of message reception, the power supply to the reception circuit is kept off until the reception permission mode start condition is satisfied. When the condition is satisfied, the timer circuit is reset and started to perform the operation in the reception permission mode again.

Figure 15:
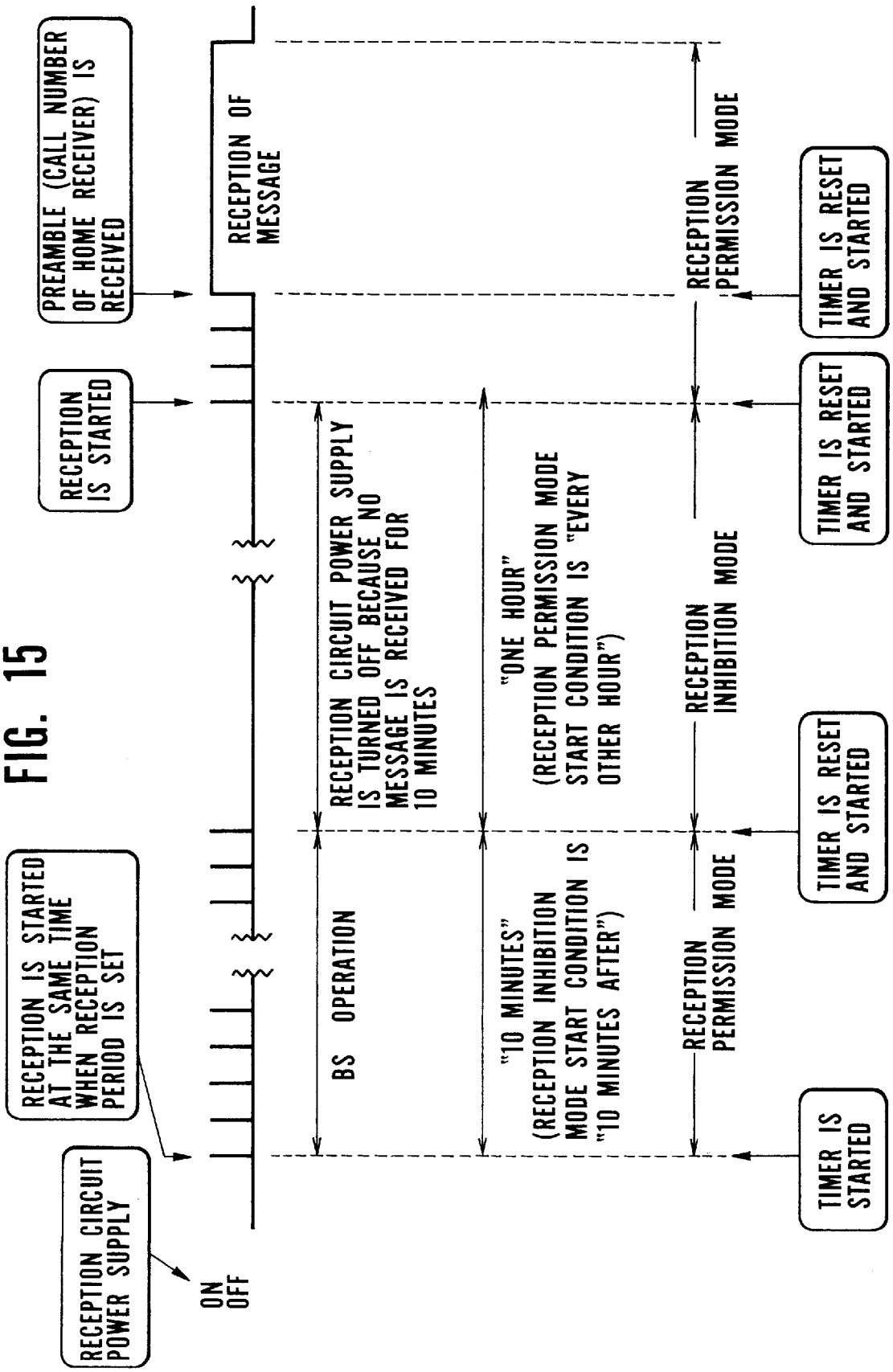
FIG. 15 is another timing chart showing reception mode switching operation in the embodiments of the present invention.

FIG. 15 is another timing chart showing reception mode switching operation in the embodiments of the present invention.

This timing chart shows operation to be performed when a reception inhibition mode is satisfied before information is received in the case shown in FIG. 14. When the reception permission mode is switched to the reception inhibition mode, the timer circuit 10 is reset and started to start a time counting operation for determination of a reception permission mode start condition.

Figure 16:
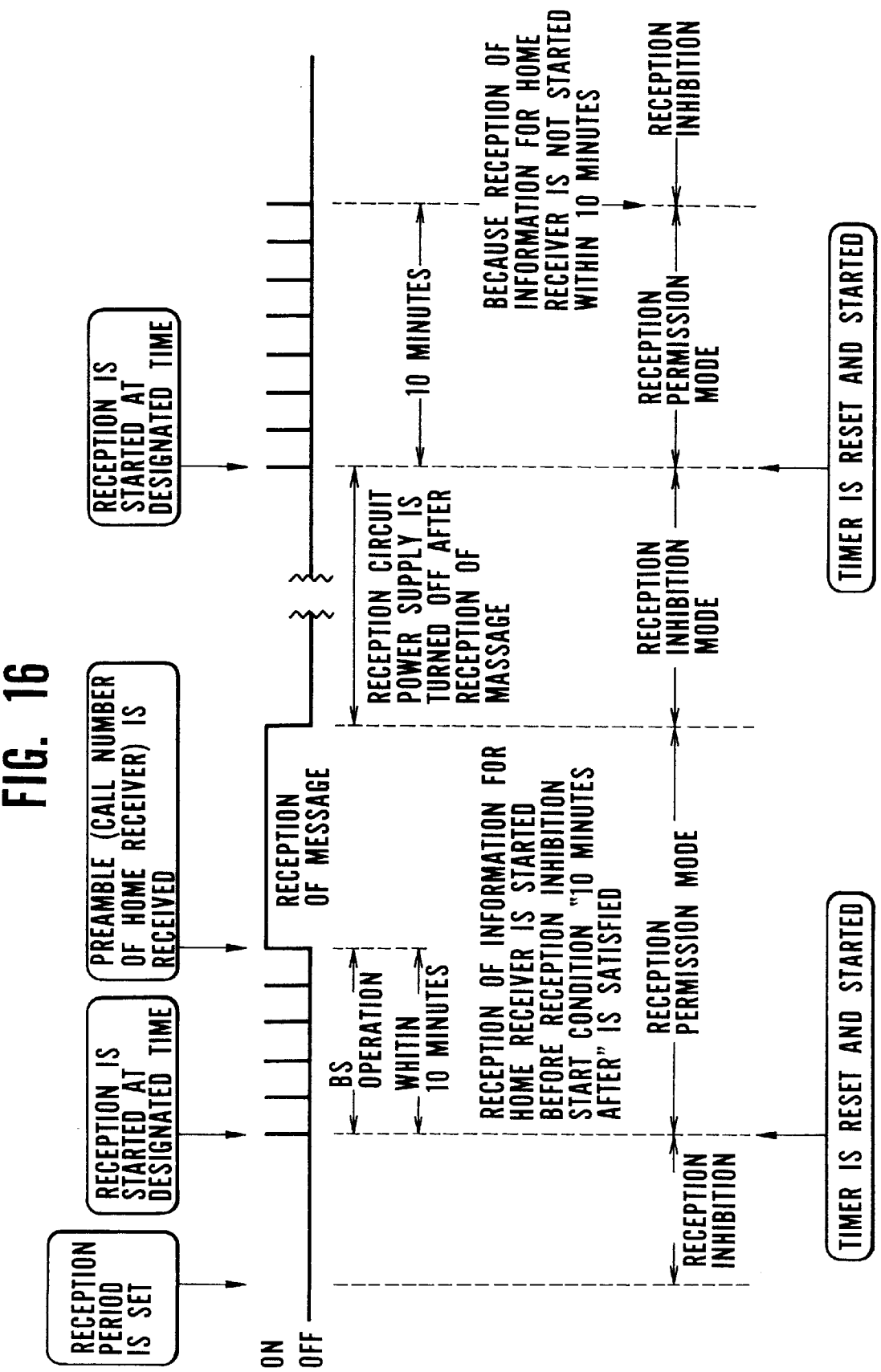
FIG. 16 is still another timing chart showing reception mode switching operation in the embodiments of the present invention.

FIG. 16 is still another timing chart showing reception mode switching operation in the embodiments of the present invention.

This timing chart shows operation to be performed when only one call number of information number is set, a reception permission mode start condition is set to be "designated time", and a reception inhibition mode start condition is set to be "a predetermined time after the reception permission mode is started" ("10 minutes after the reception permission mode is started" in this case). After a reception period is set, the receiver keeps the power supply to the reception circuit in an OFF state until the designated time. At the designated time, BS operation is performed in the reception permission mode. At the same time, the timer circuit 10 for performing time counting operation for determination of a reception inhibition mode start condition is reset and started. If information is received before the reception inhibition mode start condition is satisfied, a message is continuously received. If no information is received, the reception permission mode is switched to the reception inhibition mode. Upon completion of message reception, the power supply to the reception circuit 2 is kept off until the designated time as the reception permission mode start condition. At the designated time, the timer circuit 10 is reset and started to perform an operation in the reception permission mode.

Figure 17:
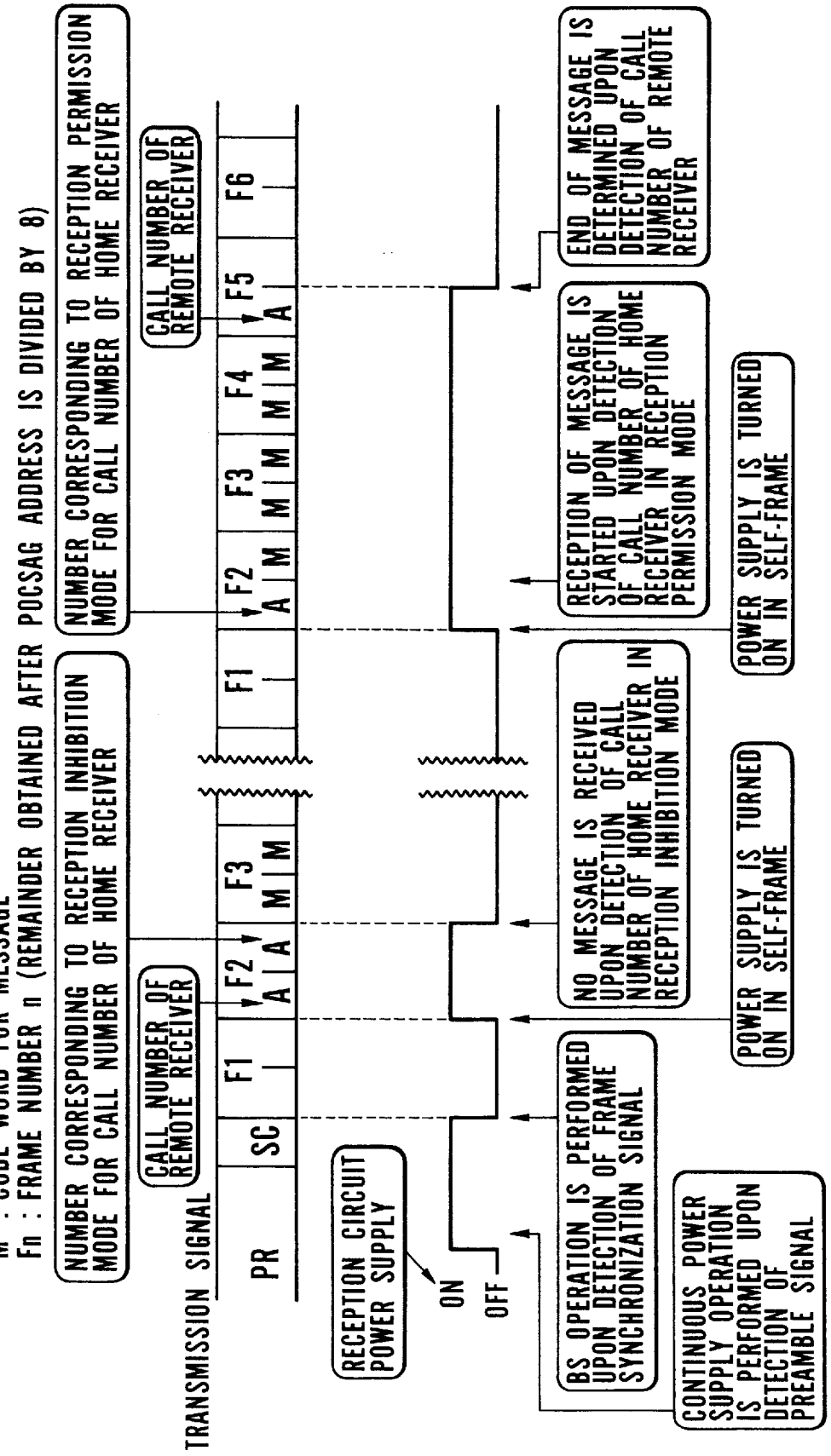
FIG. 17 is a timing chart showing message reception operation and a battery saving control operation in the first and third embodiments of the present invention.

FIG. 17 is a timing chart showing message reception operation and battery saving control operation in the first and third embodiments of the present invention.

Assume that the power supply to the reception circuit 2 is turned on in accordance with a self-frame number (F2 in this case) corresponding to the call number of each receiver, and the call number of the home receiver in the reception permission mode is received. In this case, the next incoming message is received. Otherwise, the power supply is turned on for only a self-frame, but is turned off for other frames. Upon completion of message reception, the power supply to the reception circuit is turned off.

Figure 18:
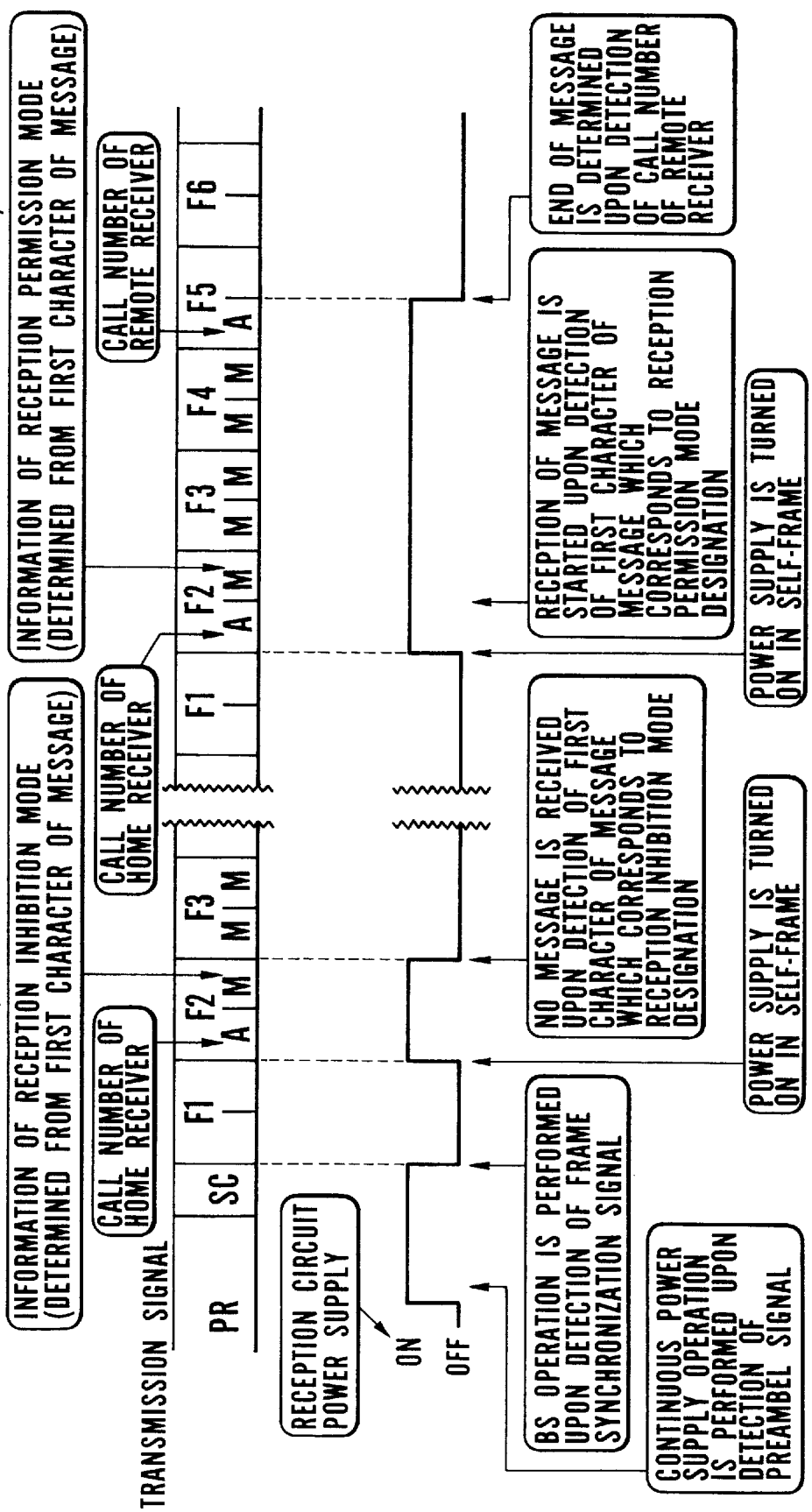
FIG. 18 is another timing chart showing message reception operation and battery saving control operation in the second and fourth embodiments of the present invention.

FIG. 18 is another timing chart showing message reception operation and battery saving control operation in the second and fourth embodiments of the present invention.

In order to determine an information number, one character of a message must be received. In the POCSAG scheme, reception is performed in units of words. For this reason, unlike the operation shown in FIG. 17, if the call number of the home receiver is received, at least one word of succeeding message words is received. If information in the reception permission mode is determined from the received word, message reception is continuously performed. When information in the reception permission mode is determined, the power supply to the reception circuit is turned off.

As has been described above, according to the present invention, a user on the reception side sets the frequency of reception for each incoming call number or the type of information. With this operation, the use can receive only information selected from incoming messages from many persons, especially a large number of unspecified persons. Even if, therefore, the number of messages transmitted from the transmission side increases, the reception circuit need not perform any unnecessary operation, and the power consumption of the receiver can be reduced. In addition, any unnecessary information need not be stored in the message memory in the receiver to allow reduction in the used capacity of the memory.

What is claimed is:

1. A radio selective calling receiver which has at least one call number and includes means for storing received data when power is supplied to a reception circuit and a call signal is received, comprising:
    a means for setting a different reception period for each call number;
    a timer circuit for counting said reception periods; and
    a battery saving control circuit for ON/OFF-controlling power supply to said reception circuit such that power is supplied to said reception circuit, during only said reception periods.

2. The receiver according to claim 1, wherein said battery saving control circuit intermittently supplies power to said reception circuit when said reception periods are is designated in a reception permission mode, continuously supplies power to said reception circuit when the selective call number of the receiver is received, and stops power supply to said reception circuit at an end of said reception periods when reception is inhibited.

3. The receiver according to claim 1, wherein said receiver has a plurality of common call numbers, and said battery saving control circuit supplies power to said reception circuit when reception of at least one common call number is permitted, continuously supplies power when reception of an incoming call number is permitted, and stops power supply to said reception circuit at an end of said set reception period without receiving any succeeding message when reception is inhibited.

4. The receiver according to claim 1, wherein a means for controlling said reception circuit by changing said reception periods in accordance with the intention of a user comprises:

means for performing reception permission processing at predetermined intervals;

means for performing reception permission processing at a desired time; and means for keeping a reception permission state for a predetermined period of time.

5. The receiver according to claim 4, wherein said means for performing reception permission processing at predetermined intervals resets and starts said timer circuit when a call number is received.

6. The receiver according to claim 1, wherein said means for setting said different reception period designates data by a switching operation of said receiver.

7. The receiver according to claim 1, wherein said means for setting said different reception period designates data in accordance with a signal from a computer connected to said receiver.

8. The receiver for receiving an information service radio signal, from an incoming message following a call number, which allows determination of a transmission period, according to claim 1, wherein said means for setting said reception period decodes transmission period designation data designated in an incoming message, and sets the data in a reception period setting memory.

9. A radio selective calling receiver for receiving an information service radio signal, from an incoming message following a call number, which allows determination of a type of information contained in said message, comprising:

a means for setting a reception period which is dependent on said type of information for each information;

a timer circuit for counting said reception period; and a battery saving control circuit for ON/OFF-controlling power supply to said reception circuit such that power is supplied to said reception circuit during only said reception period.

10. The receiver according to claim 9, wherein said battery saving control circuit intermittently supplies power to said reception circuit when reception of at least one type of information is permitted, continuously supplies power to said reception circuit when a type of information which can be determined from part of a message following an incoming call number indicates permission of reception, and stops power supply to said reception circuit when the type of information indicates inhibition of reception.

11. The receiver according to claim 1, wherein said reception period is determined by a reception start condition and a reception inhibition condition.

12. The receiver according to claim 11, wherein said reception period start condition includes a fixed interval of time.

13. The receiver according to claim 11, wherein said reception inhibition condition includes a fixed interval of time.

14. A radio selective calling receiver capable of receiving and storing a plurality of call numbers and a plurality of information service signals, comprising:

means for designating a reception period for each of said call numbers and each of said information service signals, respectively, wherein a call or information service signal is only accepted for storage if it corresponds to a designated reception period;

said reception period including a reception permission mode and a reception inhibition mode so that an incoming call or information signal is stored if said reception permission mode is activated;

a timer circuit for counting said reception period so that the receiver activates one of said reception permission mode and said reception inhibition mode according to an amount of time which has been counted by said timer circuit, wherein said timer circuit resets according to one of a predetermined time interval or reception of a call number or information service signal;

a battery saving control circuit for limiting power supply of said receiver to said reception period only, wherein said power supply is provided to be intermittent or continuous according to a predetermined setting of said reception permission mode; and a central processing unit for identifying an incoming call number or information service signal and activating said reception permission mode or said reception inhibition mode of a corresponding reception period according to the identified incoming call number or information service signal.

* * * * *